US 6,577,626 B2

(12) United States Patent
Christie et al.

(10) Patent No.: US 6,577,626 B2
(45) Date of Patent: *Jun. 10, 2003

(54) TELECOMMUNICATIONS APPARATUS, SYSTEM, AND METHOD WITH AN ENHANCED SIGNAL TRANSFER POINT

(75) Inventors: Joseph Michael Christie, San Bruno, CA (US); Albert Daniel Duree, Independence, MO (US); Michael Joseph Gardner, Overland Park, KS (US); William Lyle Wiley, Olathe, KS (US)

(73) Assignee: Sprint Communications Company, L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/946,029

(22) Filed: Sep. 4, 2001

(65) Prior Publication Data
US 2002/0031145 A1 Mar. 14, 2002

Related U.S. Application Data

(63) Continuation of application No. 09/116,868, filed on Jul. 16, 1998, now Pat. No. 6,327,270, which is a continuation of application No. 08/525,868, filed on Sep. 8, 1995, now Pat. No. 5,926,482, which is a continuation-in-part of application No. 08/238,605, filed on May 5, 1994, now abandoned.

(51) Int. Cl.[7] .............................. H04M 7/06; H04J 3/12
(52) U.S. Cl. ..................... 370/384; 370/465; 370/522; 379/230; 379/258
(58) Field of Search ................................ 370/392, 393, 370/401, 410, 465, 474, 522, 524, 384, 385; 379/229, 230, 258

(56) References Cited
U.S. PATENT DOCUMENTS

| 4,757,526 A | 7/1988 | Foster |
| 4,853,955 A | 8/1989 | Thorn et al. |
| 4,979,118 A | 12/1990 | Kheradpir |
| 5,048,081 A | 9/1991 | Gavaras et al. |
| 5,086,461 A | 2/1992 | Thorn et al. |
| 5,182,550 A * | 1/1993 | Masuda et al. ............. 379/404 |
| 5,268,895 A | 12/1993 | Topper |
| 5,282,244 A | 1/1994 | Fuller et al. |
| 5,289,472 A | 2/1994 | Cho |
| 5,289,536 A * | 2/1994 | Hokari .................. 379/115.01 |
| 5,291,492 A | 3/1994 | Andrews et al. |

(List continued on next page.)

FOREIGN PATENT DOCUMENTS

| EP | 0435448 A2 | 11/1990 |
| EP | 0466078 A2 | 1/1992 |
| EP | 0539016 A2 | 4/1993 |
| EP | 0582418 A2 | 2/1994 |
| EP | 0592152 A2 | 4/1994 |
| EP | 592153 A2 | 4/1994 |
| EP | 592154 A2 | 4/1994 |

OTHER PUBLICATIONS

ANSI-TI.111-1992, American National Standard for Telecommunications, "Signaling System No. 7 (SS7)—Message Transfer Part (MTP)," New York, NY.
ANSI-TI.112-1992, American National Standard for Telecommunications, "Signaling System No. 7 (SS7)—Signaling Connection Control Part (SCCP)," New York, NY.

(List continued on next page.)

Primary Examiner—Min Jung
(74) Attorney, Agent, or Firm—Harley R. Ball; Steve J. Funk; Kevin D. Robb

(57) ABSTRACT

The present invention is an apparatus, system, and method for converting point codes in a signal transfer point in a telecommunications signaling system. The STP converts point codes which designate the origination and destination signaling points for the message. The conversion is based on information defined by the messages, such as origination or destination information. The present invention creates a virtual signaling system which can be reconfigured at the STP by converting point codes, and thus, altering the identities of the signaling points. The present invention is also operable to convert circuit identification codes and transfer integrated services user part messages to a user part.

24 Claims, 6 Drawing Sheets

U.S. PATENT DOCUMENTS

| | | | |
|---|---|---|---|
| 5,367,566 A | * 11/1994 | Moe et al. | 379/243 |
| 5,384,840 A | 1/1995 | Blatchford et al. | |
| 5,418,783 A | 5/1995 | Yamaki et al. | |
| 5,420,916 A | * 5/1995 | Sekiguchi | 379/230 |
| 5,440,626 A | 8/1995 | Boyle et al. | |
| 5,454,034 A | 9/1995 | Martin | |
| 5,461,669 A | 10/1995 | Vilain | |
| 5,499,290 A | 3/1996 | Koster | |
| 5,509,010 A | 4/1996 | La Porta et al. | |
| 5,546,398 A | 8/1996 | Tucker et al. | |
| 5,550,914 A | 8/1996 | Clarke et al. | |
| 5,586,177 A | 12/1996 | Farris et al. | |
| 5,592,477 A | 1/1997 | Farris et al. | |
| 5,708,702 A | 1/1998 | De Paul et al. | |
| 5,825,780 A | 10/1998 | Christie | |
| 5,835,566 A | 11/1998 | Cowgill | |
| 5,835,584 A | 11/1998 | Penttonen | |
| 5,926,482 A | 7/1999 | Christie | |
| 5,940,491 A | 8/1999 | Anderson et al. | |
| 5,991,301 A | 11/1999 | Christie | |
| 6,115,380 A | 9/2000 | Christie et al. | |
| 6,181,703 B1 | 1/2001 | Christie et al. | |
| 6,201,812 B1 | 3/2001 | Christie | |
| 6,249,529 B1 | 6/2001 | Christie et al. | |
| 6,327,270 B1 | 12/2001 | Christie | |

OTHER PUBLICATIONS

Sprague, David, "MTP Level–3 Gateway Stp Release 3.2.0," pp. 1–48, TEKELEC, Aug. 4, 1995.

Dingle, Barry T., ISDN Signalling Control Part (ISCP) Telecom Australia Research Laboratories, Australian Broadband Switching and Services Symposium, 1992.

* cited by examiner

TELECOMMUNICATIONS APPARATUS, SYSTEM, AND METHOD WITH AN ENHANCED SIGNAL TRANSFER POINT

CROSS-REFERENCE TO RELATED APPLICATION

This application is a continuation of prior application Ser. No. 09/116,868, filed on Jul. 16, 1998 now U.S. Pat. No. 6,327,270, which is a continuation of prior application Ser. No. 08/525,868 filed on Sep. 8, 1995 now U.S. Pat. No. 5,926,482, which is a continuation-in-part of prior application Ser. No. 08/238,605, entitled "Method, System, and Apparatus for Telecommunications Control", filed on May 5, 1994 now abandoned, and currently pending and that is herein incorporated by reference into this application.

BACKGROUND

1. Field of the Invention

The invention relates to telecommunications and specifically to an enhanced signal transfer point (STP) which alters the point codes in telecommunications signaling and supports User Parts in addition to providing standard STP functionality. The enhanced STP can form a portion of a telecommunications system.

2. Description of the Prior Art

Telecommunications signaling is the transfer of information within and among telecommunications networks for use by the networks. Signaling information is used to operate the telecommunications networks so these networks can transfer other non-signaling information for the network users. A few examples of signaling operations are call set-up, congestion control, and network management, although there are many signaling operations. One well known telecommunications signaling system is Signaling System #7 (SS7). At present, SS7 is the primary signaling system used by United States telecommunications providers.

As is known in the art, and as will be discussed below, STPs route SS7 signaling within the SS7 network and manage the various signaling links which comprise the SS7 network. Routing is accomplished by processing the routing label of the SS7 message by the Message Transfer Part (MTP) functionality of the signaling point. The MTP is comprised of three levels. Levels 1 and 2 facilitate the transfer of SS7 messages from one point to another over an individual signaling link. Level 3 facilitates the transfer of SS7 messages over the SS7 network beyond the requirements of individual link transmission. In other words, levels 1 and 2 are concerned with transport over individual links whereas level 3 is concerned with transport over the SS7 network in general.

An STP accomplishes its routing task at level 3 through the use of point codes which identify the various signaling points in the network. The STP level 3 will identify the destination point code in an SS7 message and select the proper signaling link for routing that message. For example, if switch A signals a switch B through an STP, the message will contain the destination point code for the signaling point in switch B (and the originating point code for switch A). The STP will accept this signal off of one signaling link, read the destination point code, and place the message on the appropriate link for switch B.

An STP can also control the signaling network through the use of management messages generated at level 3. In the above example, if there were signaling links between switch A and the STP, the STP might signal switch A with instructions to avoid particular links which were congested or had failed.

Telecommunications networks are commonly faced with the problem of re-routing user traffic among switches. Traffic may need to be re-routed from one switch to another switch, from one switch to multiple switches, from multiple switches to one switch, or from one group of switches to a different group of switches. When traffic accessing a network is directed to a particular switch, the traffic is described as being homed to the switch. Traffic being homed to particular switches may need to be re-homed to other switches.

Re-routing the user traffic encompasses changing the connections between the switches. Connections between switches may be added and deleted to create new network architectures. Due to the relationship between signaling and network architecture, any change in architecture needs to be reflected in the signaling system. A common method for doing this is to re-program the switches to signal each other in accord with the new architecture. This a complex and time consuming task. Switches contain numerous data files which must be re-programmed in accordance with the new routing scheme.

One prior art system facilitated the transition of trunks from an old switch to a new switch. The system converted the point codes in signaling messages directed to the old switch in response to a change in a trunk assignment from the old switch to the new switch. The converter was placed between the switch and the STP so that it only handled signaling on the signaling link connected to the old switch. It used a look-up table to yield the point codes. Since particular trunks would be connected to either the new switch or the old switch based on an assignment, a table could be constructed to identify the particular trunk used on a call and convert point codes based on this trunk/switch/point code assignment. The prior art suggests placing this conversion function in an STP, but it does not disclose more on this point.

Although this prior art system may be adequate for the limited scenario encompassing the transition of individual trunks from an old switch to a new switch, it does not address the problem of changing network architectures beyond this limited scenario. The prior art system is designed to serve two switches which share a single switch load and a common signaling destination. In other words, the system is limited to a situation in which signaling which has already been routed to the old switch is split between the old switch and the new switch during the transition of loads between the two switches.

As a result of this limitation, several problems are not addressed by the prior art system. Since it is based on identifying individual trunks for point code conversion, signals that cannot be associated with a specific trunk would not be able to have their point codes converted. The prior art system does not address the problem of handling management messages which are generated for the control of the signaling system. Also, the reliance on individual trunk identification does not adequately address situations in which entire switch loads are moved between switches, or when multiple switch loads are consolidated on a single switch. Because all trunks between switches are being changed over, individual trunk recognition is unnecessary.

Importantly, the prior art system does not identify the origination of the signaling message in order to select a destination for the signaling. The prior art system does screen the messages which originate from the new switch so these signals can be converted to represent the old switch as the source of the signaling. This is done in order to avoid confusion at the destination, but it does not affect the actual selection of the destination. In the prior art system, the destination is not chosen based on the origin of the message. The prior art system uses only trunk identification to choose the destination. This is detected using either the dialed number or the Circuit Identification Code (CIC).

It is also important to note that the prior art system is designed only to convert signaling that has been placed on the signaling link connected to the old switch. This means the STP has already isolated the signaling messages as directed to the old switch. Thus, the system does not see signaling directed to any other switch, and it is not equipped to process signaling that has not been directed to the old switch. As such, an STP incorporating this system would convert the point codes only after the STP has performed routing processing and designated the signaling as being directed to the old switch. Thus, the STP of the prior art system would not apply to a conversion function for incoming signals which had yet to be routed and could still be directed to any switch.

Another prior art system provides a signaling gateway between two signaling systems, for example, a gateway for the signaling systems of Europe and the United States. The signaling gateway converts point codes based on the network identification and the destination point code. The gateway does not convert point codes based on originating information, such as the signaling link or the originating point code. The gateway also converts point codes after the destination point code has been used for message routing. Also, since the gateway must interface signaling of different signaling systems, it necessarily includes more functionality and cost than a point code converter that does not have gateway functionality.

The above-referenced application discloses a signaling processor. The signaling processor receives, processes and transmits signaling. In some instances, the signaling processor will not have a point code to facilitate the routing of signaling messages. In other instances, the signaling processor may receive signaling that was actually transmitted to a switch, but needs to be processed by the signaling processor instead of the switch. The prior art does not address the signaling transfer needs of these signaling processors.

Typically, an STP routes signaling among several switches. Present systems do not provide an efficient and workable STP which can convert signaling in a way that accounts for architectural changes affecting several of the switches. At present, there is a need for an STP that can better facilitate architecture changes in a telecommunications network.

SUMMARY

The present invention is an STP, a system, and a method that solves the problems posed by changes in architecture and the needs of signaling processors. The STP applies Message Transfer Part (MTP) functions to signaling messages that contain point codes. A first means applies the signaling data link function, a second means applies the signaling link function, and a third means applies the signaling network function. A converting means is added for converting at least some of the point codes in the signaling messages into different point codes.

The converting means can be located between the second means and the routing function of the third means. Point code conversion may be based on the point codes originally contained in the messages or on origination information, such as the particular signaling linksets on which the messages are transferred to the STP. MTP level 3 management messages are also converted. The converting means could be comprised of a table which is entered using the point codes or linkset designations and which yields the converted codes. In addition, Circuit Identification Codes (CICs) can be converted along with the point codes.

The present invention is operable to transfer integrated services user part (ISUP) messages to any user parts coupled to the STP. The user parts may include signaling processors.

A signaling system embodying the invention is comprised of multiple signaling points linked to a signal transfer point. The links can be direct or through other STPs. The signaling points generate and process signaling messages and transfer them to the STP over the links. The signaling messages contain codes that identify origination signaling points and destination signaling points for the messages. The STP is enhanced in accord with the present invention and is operable to convert destination codes for signaling messages directed to a plurality of signaling points.

A method embodying the present invention includes receiving a signaling message into the signal transfer point from an originating signaling point. The signaling message contains codes which identify the origination signaling point and the destination signaling point for the message. The STP then converts at least a portion of the codes in the message to different codes before the signaling message has been designated by the STP for a particular destination signaling point. The STP then transfers the signaling message to a signaling link based on the converted codes. The conversions can be based on the codes in the initial message and/or on a particular linkset the signaling message is received on.

In one embodiment, telecommunications traffic is re-routed among switches. However, the signaling points in the switches are not reprogrammed and continue to generate and transmit signaling to the STP according to the old architecture. The STP converts the point codes in the messages to identify the switch that actually receives the traffic after the re-route, and routes message to that switch according to the converted destination point code.

Advantageously, the conversion function is located prior to the MTP level 3 route function allowing a single integrated and flexible system. Conversions selecting a destination can be based on the origin of the signaling. Management messages are also converted to facilitate control of the signaling system.

In another embodiment, the point codes in signaling messages are converted between the point code of a signaling processor and the point code of other signaling points. This might occur if signaling is being routed to a signaling processor instead of a switch even though the signaling message identifies the destination point code of the switch. Messages from the signaling processor may need to have the originating point code converted to another point code, i.e. the switch that was to receive the initial message. In another embodiment, the signaling processor could be a user part of the STP and require that select signaling messages are routed through the signaling processor.

BRIEF DESCRIPTION OF THE DRAWINGS

These and other features, aspects, and advantages of the present invention will become better understood with regard to the following description, claims, and drawings where:

DESCRIPTION

Figure 1:
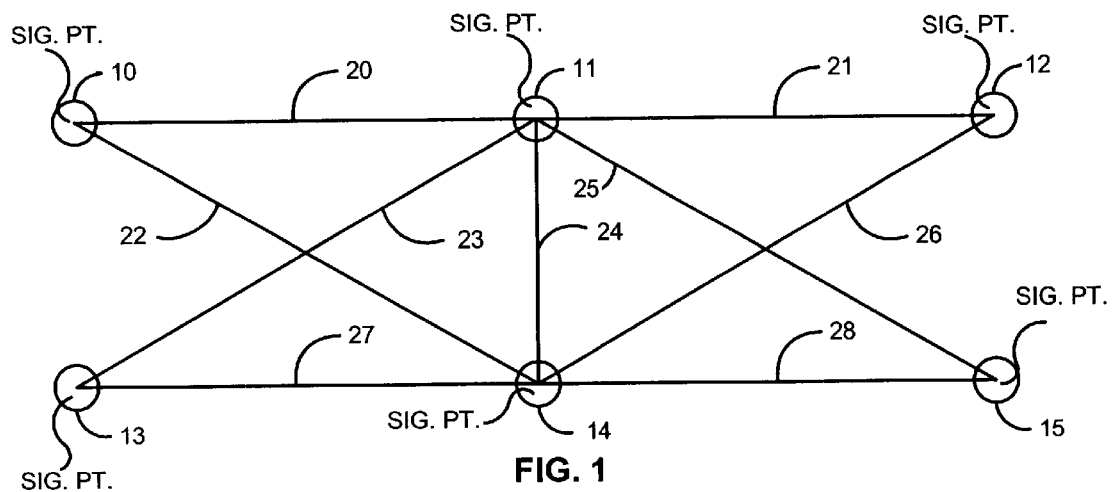
FIG. 1 is a block diagram of a signaling system.

As those skilled in the art are aware, SS7 systems are currently comprised of basic components such as, signaling points, signaling transfer points (STPs), and signaling links. Signaling points process the signaling information to facilitate network operations. Signaling links transfer this signaling information among the various signaling points. FIG. 1 is provided to illustrate this basic relationship and it shows a basic signaling system comprised of signaling points 10–15 and signaling links 20–28. Links 20–28 carry signaling used to operate the network, and the actual lines which carry telecommunications traffic are not shown.

A common example of a signaling link is a 56 k/bit data link contained in a T1 line. However, these links can take many different forms such as analog links, satellite links, and 1.5 M/bit data links. Typically, the links are grouped into multiple associations of links called linksets.

Signaling points process the signaling information transferred by the signaling links. Often, a signaling point is located within a telecommunications switch. As is known, switches typically include a central processing unit (CPU), a signaling point, and a switch matrix. The signaling point is connected to the switch CPU and provides the CPU with data so it can control the switch matrix. Switches will communicate to each other through their signaling points over the signaling links. In this way, the various switch matrices can be coordinated by the switch CPUs to establish a connection through a series of switches.

Signaling points can also be located in Service Control Points (SCPs). As those skilled in the art are aware, SCPs include databases that respond to signaling from switches. Typically, the SCP will accept a query from a switch as to how a particular call should be routed. The SCP will process the signal and respond to the switch with a signal that provides routing information.

STPs can function as a signaling point in addition to the signaling transfer function. The STP accepts multiple signaling links from numerous signaling points. The STP's primary function is routing; placing incoming signaling on the appropriate outgoing signaling link. Typically, the signaling points in switches and SCPs are linked to STPs and transmit signaling to the STPs for routing to the proper destination signaling point in another switch or SCP. STPs also perform management functions for the SS7 network.

Other types of signaling points are equally applicable to the present invention. For example, the above referenced signaling processors can function as signaling points. In addition, other signaling systems, such as C7 signaling, are equally applicable to the present invention.

Figure 2:
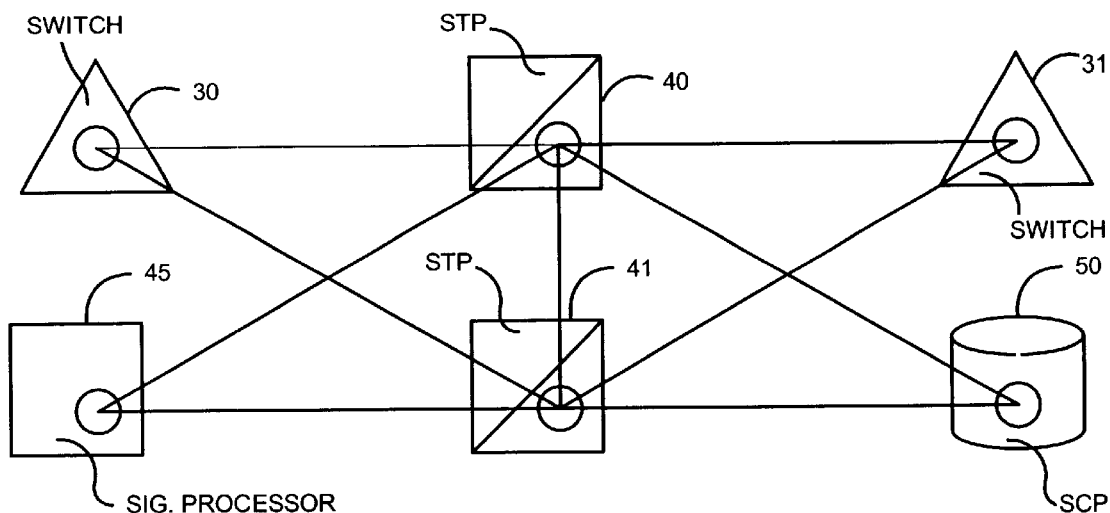
FIG. 2 is a block diagram of a telecommunications network including a signaling system.

FIG. 2 further illustrates the basic relationship of FIG. 1 and is an overlay of FIG. 1. FIG. 2 shows switches 30–32, STPs 40–41, signaling processor 45, and SCP 50 which each include a signaling point that is linked to signaling points in other network elements. As discussed, the signaling points in the switches are typically coupled with a switch CPU that controls the switch matrix.

The SS7 signal itself is a packet, or message, of information bits. The functionality which processes SS7 signaling messages is fundamentally divided into two parts: the Message Transfer Part (MTP), and the User Part. The function of the MTP is to provide transport for the SS7 messages within the signaling system. Those skilled in the art are familiar with functions in the User Part, such as the Integrated Service User Part (ISUP), the Telephone User Part (TUP), the Transaction Capabilities Application Part (TCAP), and the Signaling Connection Control Part (SCCP). These functions "use" the MTP to transfer signaling messages over the signaling links of the SS7 network so that the User Part may process information required by the switches such as dialed numbers, translation numbers, and circuit status.

Since STPs serve to route and manage the SS7 network, they do not require User Part functionality which pertains to information about calls and connections in the general telecommunications network. STPs are concerned with being able to route SS7 messages within the signaling network to the appropriate signaling points in switches and SCPs. The STP employs MTP processing to accomplish this function. In addition, the STP can employ signaling connection control part (SCCP) logic to facilitate routing. SCCP allows signaling message routing based on logical connections. For example, a signaling message requesting a dialed number translation can be sent to the STP itself. SCCP would provide the STP with the point code for the appropriate database that could accommodate the translation.

MTP functionality is comprised of three levels: signaling data link (level 1), signaling link (level 2), and signaling network (level 3). Level 1 represents the bi-directional signal path comprising two data channels operating together in opposite directions. Level 1 defines the physical and electrical characteristics of the signaling link. Typically, this entails 56 k/bit data link operation, however, other forms of links are equally applicable to the present invention. Level 2 operates over level 1 to provide for the transfer of signaling from point to point over a single data link. This includes delimiting the signaling messages with flags, bit stuffing, error detection through check bits, error correction through retransmission and sequence information, signal link failure detection, and signal link recovery. For example, on FIGS. 1 and 2, the first two levels might be used to provide transport over signaling link 20 at 56 k/bit from signaling point 10 in switch 30 to signaling point 11 in STP 40. The first two levels would also ensure that signaling link 20 is monitored for proper performance. Level 3 defines the transport functions that are independent of the operation of individual signaling links. For example, from switch 30 to SCP 50 on FIG. 2.

Figure 3:
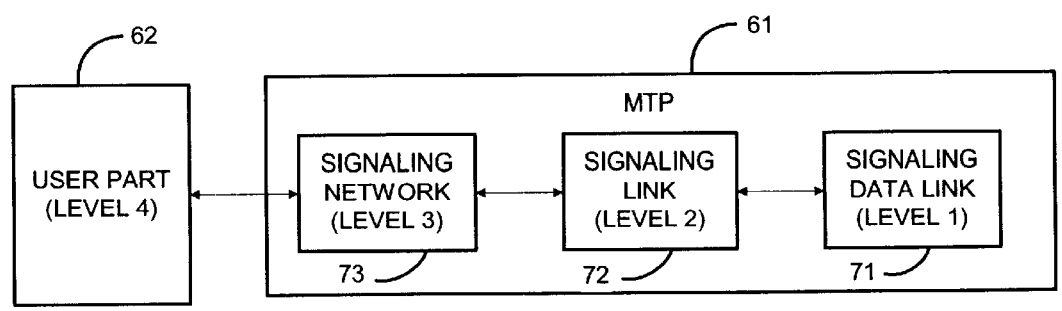
FIG. 3 is a logical diagram of SS7 functionality.

SS7 functionality is illustrated in FIG. 3 with MTP 61 and User Part 62. The separation of the MTP and the User Part is shown. The MTP handles transport of signaling messages within the signaling network and the User Part facilitates the operation of the network which carries telecommunications traffic. An example of a user part would be a signaling processor. Signaling Data Link 71 (Level 1) which handles the physical/electrical transport on individual links is coupled with Signaling Link 72 (level 2) which performs monitoring and control of these same individual links. Signaling Network 73, or level 3 is shown between the User Part (level 4) and level 2. Level 3 provides the interface between the User Part and individual link transport. Level 3 also manages the SS7 network beyond the individual link level.

Figure 4:
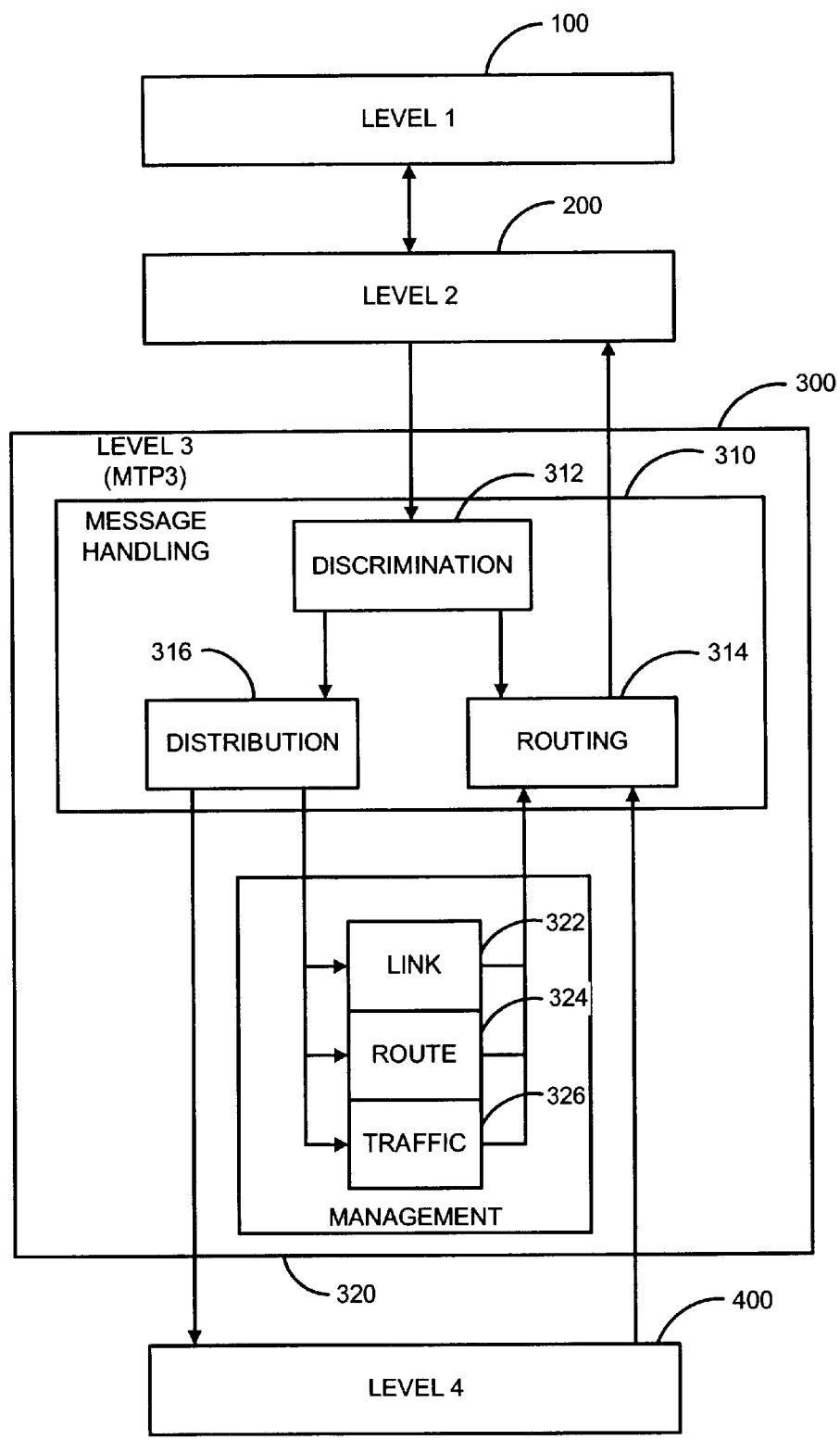
FIG. 4 is a logical diagram of a version of the invention.

FIG. 4 displays this functionality, and particularly level 3 functionality, in greater detail. The functions of Signaling Data Link 100 (level 1) and Signaling Link 200 (level 2), Signaling Network 300 (level 3), and User Part 400 (level 4) have been discussed above. Signaling Network 300 further includes Signaling Message Handling 310 which ensures that messages from User Part 400 are delivered to the proper destination primarily according to a routing label contained in the message. Signal Message Handling 310 is comprised of Discrimination 312, Routing 314, and Distribution 316.

Prior to a discussion these elements, a short description of the routing label follows. The routing label is contained in each signaling message and is used by the relevant User Part to identify the purpose of the message and is used by level 3 to process and route the message. The routing label is typically placed at the beginning of the signaling information field. This routing label contains both a Destination Point Code (DPC) and an Originating Point Code (OPC). These point codes identify signaling points in the network—and in particular, the originating and destination signaling point for a particular message. For example, a message sent from signaling point A to signaling point B would have an OPC of A and a DPC of B. A return message would reverse the two and have an OPC of B and a DPC of A. The routing label also contains a Signaling Link Selection (SLS) field which is used to allow load sharing among links.

Standard international signaling has a 14 bit DPC, 14 bit OPC, and a 4 bit SLS. Standard U.S. signaling has a 24 bit DPC, 24 bit OPC, and a 5 or 8 bit SLS. The 24 bits of the U.S. point code are broken into three 8 bit fields that identify the signaling point, the network, and the network cluster to which the point code belongs. The 8 bit cluster member code 00000000 is reserved for STPs. It should be pointed out that other signaling conventions are equally applicable to the present invention.

Referring again to FIG. 4, Discrimination 312 analyzes the DPC of a message to determine if that particular signaling point (performing the discrimination function) is the destination of the message. If it is not the destination, the message is directed to Routing 314 for transfer on the signaling network. If it is the destination, the message is directed to Distribution 316 for internal processing.

Distribution 316 analyzes the service indicator in the message to direct the message to the appropriate user of User Part 400 or to the appropriate part of Signaling Network Management 320.

Routing 314 accepts messages from Discrimination 312, User Part 400 and Signaling Network Management 320. Routing 314 determines the signaling link over which these outgoing messages are sent and delivers these messages to level 2 for transmission. Typically, the DPC is used to select a combined link set and the SLS is used to select the link within the combined link set on which to place the message. The DPC controls the actual destination of the message, but many other factors can affect route choice such as congestion and link failure. Signaling Network Management 320 provides this type of information to Routing 314.

Signaling Network Management 320 is comprised of the following functions: Signaling Link Management 322, Signaling Route Management 324, and Signaling Traffic Management 326. The primary function of these elements is to provide control of the signaling network in the case of failures and congestion.

Signaling Link Management 322 controls the status of particular links. It may use the following procedures to control the links: link activation, link deactivation, link restoration, linkset activation, and automatic allocation.

Signaling Route Management 324 distributes information about the status of the links. This information may indicate failed or congested links and includes: transfer prohibited, transfer allowed, transfer restricted, transfer controlled, signaling route set congestion test, and transfer route set test.

Signaling Traffic Management 326 is used to re-route signaling in order to respond to system conditions such as failure or congestion. Signaling can be diverted or partially diverted (inhibited) from one link to another. These procedures are: changeover, changeback, forced re-routing, controlled re-routing, MTP restart, management inhibiting, and flow control.

As those skilled in the art are aware, an STP will house the MTP functionality discussed above. In accord with the present invention, the functionality of the STP can be altered to provide advantageous capabilities to a telecommunications system.

Figure 5:
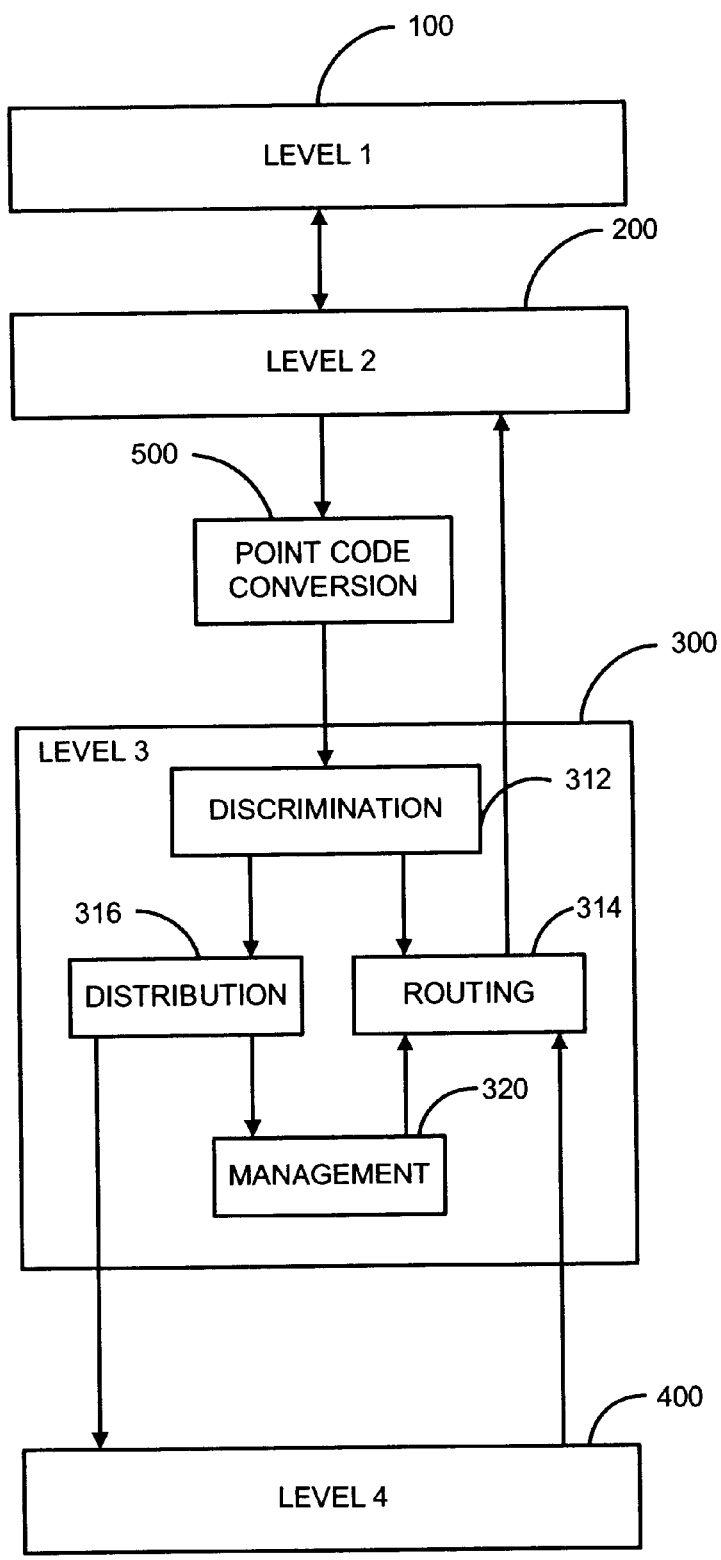
FIG. 5 is a logical diagram of a version of the invention.

FIG. 5 depicts the functionality of an STP that is in accord with the present invention. Signaling Data Link 100 (level 1), Signaling Link 200 (level 2), Signaling Network 300 (level 3) and User Part 400 (level 4) are again shown. Additionally, Discrimination 312, Routing 314, Distribution 316, Signaling Network Management 320 are shown as functions of Signaling Network 300. These functions interface as discussed above with the following modifications.

Point Code Conversion 500 is added and shown between level 2 and level 3. Point Code Conversion 500 accepts the messages from Level 2 and provides messages to Discrimination 312. Point Code Conversion 500 translates the data in the signaling messages using internal tables. Typically, these tables would logically reside in the MTP software processed by the STP. The tables would be used to systematically change designated DPCs, OPCs, and CICs of the signaling messages directed to Discrimination 312.

The appropriate table could be selected based on the linksets or signaling clusters that the messages arrive on. These linksets and clusters represent the origin of the messages. The tables could also be selected or entered based on the OPC which also represents the origin of the messages. The tables could then use the OPC, DPC and/or CIC of the messages to select new data for the conversion, including a new OPC, DPC, and/or CIC. Because Routing 314 will select the outbound link based on the DPC, Point Code Conversion 500 can change the actual destination of the signaling message. The tables would be constructed to effect these desired changes.

Alternatively, only the DPC could be used for the entire conversion. One table would house DPC to DPC conversions. Additionally, at a point in the STP where processing is still linkset specific (before level 3), MTP linkset processing could place flags in the messages from designated linksets. Those messages coming from the particular linksets would access the table during subsequent processing when the flag was detected, and unflagged messages would not access the table. The table could convert combinations of OPC, DPC, and/or CIC into specified combinations of OPC, DPC, and/or CIC.

Referring again to FIG. 4, it can be shown how Discrimination 312 could be altered in accord with the present invention. As discussed, Discrimination 312 determines whether the messages are destined for the STP itself, a User Part, or another signaling point. A conversion table which is based on linkset, OPC, DPC, and/or CIC could be functionally located at this point. The table could process all signaling messages, messages not directed to the STP's DPC, or messages flagged in prior processing. The present invention thus applies to a point code conversion function located at Discrimination 312. The converted messages would typically be transferred to Distribution 316 in this case.

In one embodiment, a Digital Switch Corporation model Megahub STP is used. This STP has a particular feature for gateway screening. This feature screens incoming messages with a set of criteria defined for each linkset delivering messages. The criteria ensures that the messages are valid for that linkset. At present, this feature only screens messages and does not convert them or map point codes. In this embodiment, the Point Code Conversion 500 is located in the STP between levels 2 and 3 at the point of the gateway screening feature. Alternatively, only a flagging function could be placed at the gateway screening feature, and a conversion table could convert flagged messages during subsequent processing.

By placing the conversion tables at a point in the STP that is specific to the incoming linkset, the point code conversions can be specified for the signaling point(s) transmitting signals on the given linkset. In other words, signaling conversions can be specified individually based on the origin of the signaling. This placement also allows the level 3 functionality to process the converted signal, instead of processing a signal first, and then converting the point codes at the output. Similar advantages can be attained by flagging the messages on particular linksets and using the OPC to ascertain the origin during subsequent processing.

User Part 400 (level 4) may include a signaling processor, such as that described in parent application Ser. No. 08/238,605, entitled "Method, System, and Apparatus for Telecommunications Control", filed on May 5, 1994, or in a patent application entitled, "System for Managing Telecommunications", filed simultaneously with this application, and assigned to the same assignee. The signaling processor may process particular ISDN Services User Part (ISUP) signals. In at least one embodiment, Discrimination 312 would be configured to identify the particular ISUP messages required by the signaling processor. These criteria could be formed into a table, and the table used to identify the appropriate ISUP messages from Distribution 312 to transfer to the application processor. Like the point code conversion tables, the origin of the signaling as represented by the linkset or the OPC could be used to determine if ISUP should be transferred to the pertinent user part. The OPC, DPC, SLS, CIC and various combinations of these elements could also be used for this purpose as well. Those skilled in the art will appreciate other criteria that can be used to route messages to a signaling processor. Additionally, a flagging function could be used during linkset specific processing to trigger transfer of ISUP to a level 4 user during subsequent processing. Those skilled in the art are familiar with ISUP identification.

Figure 6:
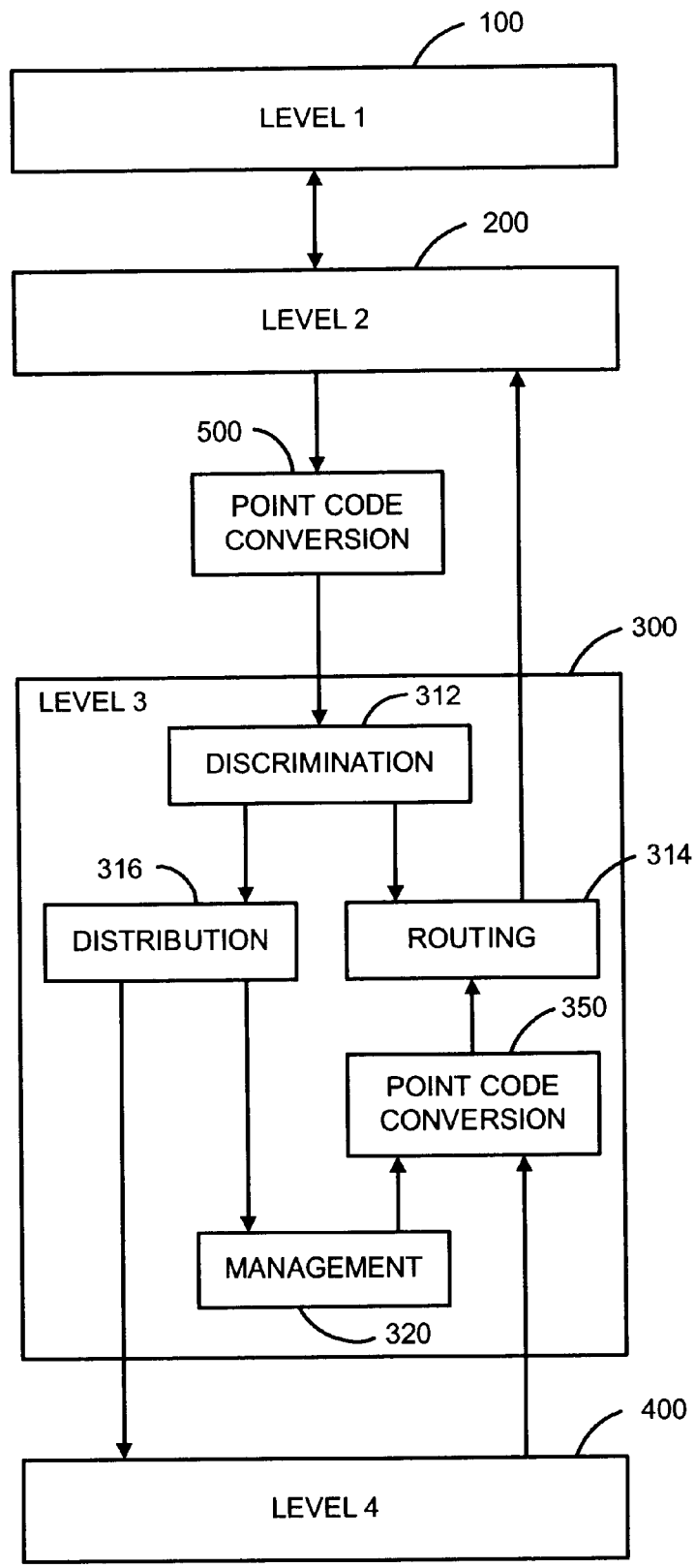
FIG. 6 is a logical diagram of a version of the invention.

Another embodiment is shown on FIG. 6 which shows the same elements as FIG. 5 except for one addition. In this embodiment, additional point code conversion may be required for messages generated by Signaling Network Management 320 or User Part 400. For these embodiments, Point Code Conversion 350 is added and shown between Signaling Network Management 320 and Routing 314, as well as, between User Part 400 (level 4) and Routing 314. Point Code Conversion 350 operates through the use of tables as does Point Code Conversion 500. In this way, the point codes in management messages or from a user part can be converted. Typically, the changes would account for the architectural changes in a way similar to Point Code Conversion 500.

As discussed above, Signaling Network Management 320 is comprised of three functions: signaling link management, signaling traffic management, and signaling route management. As an example, if a signaling link fails, signaling link management will perceive this and report it to signaling traffic management which will transmit signals to other signaling points to re-route signaling over an alternate link. If this were to cause congestion on the alternate link, signaling route management would transmit signals to the other signaling points instructing them to restrict use of the congested link.

Typically, signaling link management messages will not need any point code conversion. However, signaling traffic management messages and signaling route management messages both provide other signaling points with signaling instructions for affected signaling links and points. Point codes are used to define the affected signaling links and points. These messages will need the identification point codes changed to account for new network architectures. These changes are affected by tables as discussed above for the point codes used for routing. The management messages can be specified for each signaling point receiving one of the messages by using the DPC in the routing label to enter the table. The table would be constructed to give each signaling point which receives a management message the point codes it understands in the given point code converting scenario.

Figure 7:
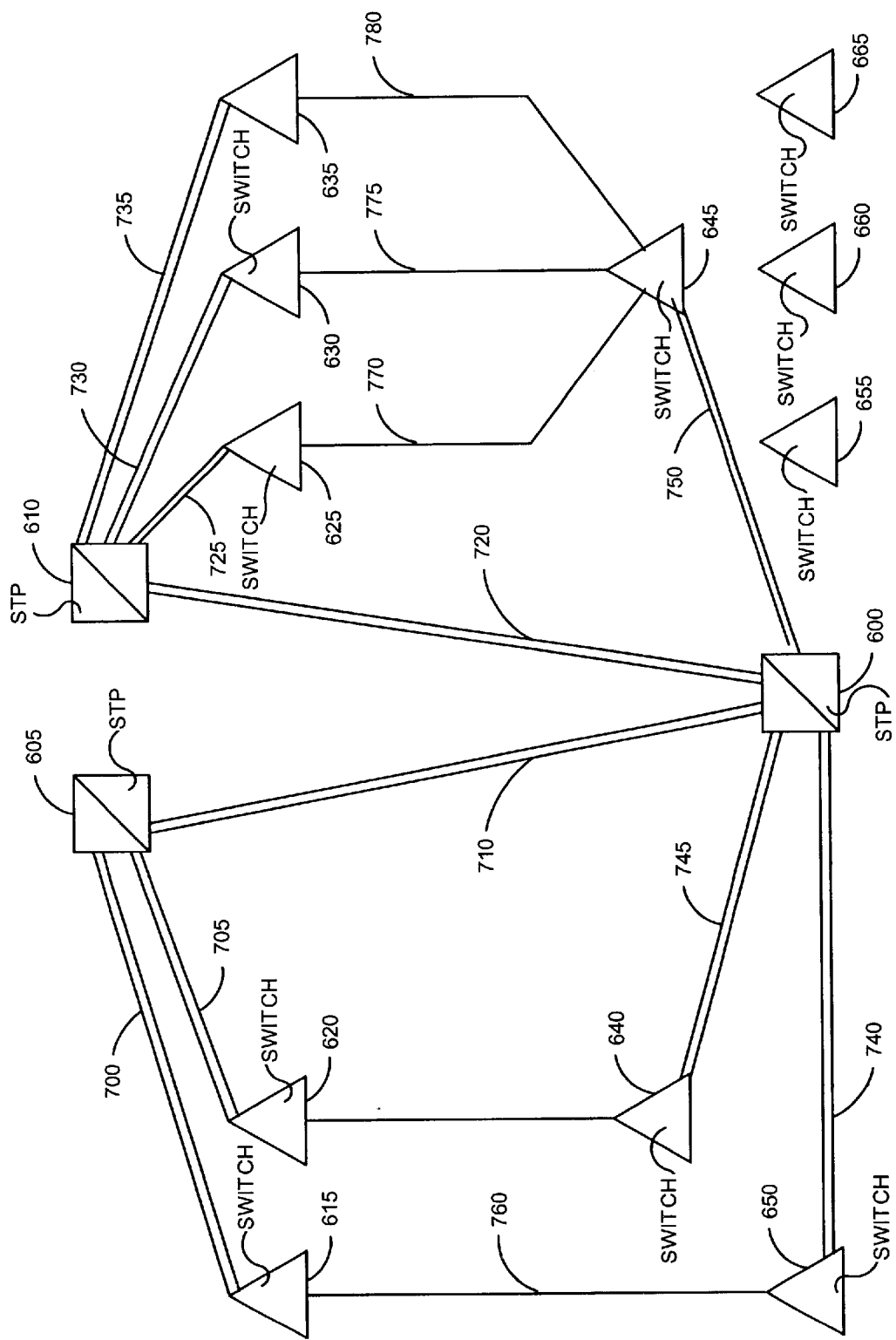
FIG. 7 is a block diagram of a version of the invention.

Another embodiment is shown in FIG. 7 which depicts a telecommunications system including enhanced STP 600 which operates in accord with the present invention. STPs 605 and 610 are also shown along with switches 615, 620, 625, 630, 635, 640, 645, 650, 655, 660 and 665. STPs 605 and 610 are standard STPs which are known in the art. The switches are standard telecommunications switches which are known in the art.

In FIG. 7, signaling links are represented by the double lines and telecommunications connections are represented by the single lines. The switches and STPs are interconnected with signaling links 700, 705, 710, 720, 725, 730, 735, 740, 745, and 750 as shown on the drawing. These links transfer signaling among the switches and STPs as discussed above. The switches are interconnected by connections 760, 765, 770, 775 and 780 as shown on the drawing. The connections carry telecommunications traffic for users of the telecommunications system as is known in the art.

To understand this embodiment, it should be pointed out that the system architecture has been modified from the following architecture (former connections are not shown): a connection from switch 620 to switch 650 was re-routed to switch 640, a connection from switch 625 to switch 655 was re-routed to switch 645, a connection from switch 630 to switch 660 was re-routed to switch 645, and a connection from switch 635 to switch 665 was re-routed to switch 645. The connection from switch 615 to switch 650 did not change. The switches have not been re-programmed to accommodate signaling in accord with the new architecture. In addition, STPs 605 and 610 have not been enhanced in accord with the present invention.

When switch 630 attempts to connect to switch 660 (its former connection), it actually connects to switch 645. However, switch 630 would still direct signals to switch 660 when it attempts the connection. The signaling would be routed to STP 600 and would be processed in accord with present invention. The DPC in the signaling would be converted to represent switch 645 instead of switch 660. The signaling would then be routed to switch 645. When switch 645 responds to switch 630 acknowledging the connection, STP 600 will convert the OPC from switch 645 to represent switch 660. In this way, switch 630 is able to signal and make connections in accord the new architecture without being re-programmed.

When switch 620 attempts to connect to switch 650 (its former connection), it actually connects to switch 640 over connection 765. However, switch 620 will still attempt to signal switch 650. The signal would be routed over link 705 through STP 605 and over link 710 to STP 600. The DPC would be converted by STP 600 to represent switch 640 instead of switch 650. The signal would then be routed to switch 640 over link 745. When switch 615 attempts to connect to switch 650 (its former and current connection), it will signal switch 650. The signal would be routed over link 700 through STP 605 and over link 710 to STP 600. In this case, no conversion is needed. Thus, sometimes STP 600 should convert the DPC for switch 650, and sometimes it should not. The present invention allows STP 600 to discern whether or not to make the conversion.

STP 600 will identify the source of the signaling before making the conversion. This identification could be by OPC. In this way, the conversions for switch 615 would be different than the conversions for switch 620. For the OPC of switch 615, the DPC for switch 650 would not be converted. For the OPC of switch 620, the DPC for switch 650 would be converted to the DPC for switch 640.

Additionally signaling messages sent in the backward direction could undergo conversion at the STP in a similar manner. For example, messages from switch 645 to switch 630 and from switch 640 to switch 620 would have their OPC converted to represent switch 660 and switch 650 respectively. The message from switch 650 to switch 615 would not need the OPC to be converted.

Point codes can also be converted at STP 600 based on the signaling link that the message arrives on. For example, signaling from switch 650 to switch 615 does not need conversion, but signaling from switch 640 to switch 620 does need converted to account for the new architecture. STP 600 could be configured to convert the OPCs for signaling messages arriving on signaling link 745 to the OPC for switch 650. STP 600 would not convert the OPCs for signaling messages arriving on signaling link 740. As can be seen, conversion can be based on many factors, such as signaling link, OPC, DPC, CIC, SLS, and various combinations of these factors. Other factors are also contemplated by the invention.

As stated above, signaling networks use management messages to control the signaling network. An example of such messages is a transfer restricted message. If link 750 between STP 600 and switch 750 becomes congested, the signaling route management function in STP 600 would generate and transmit transfer restricted messages to alleviate congestion on link 750. In the signals, the congested link is defined by the point code for switch 645 (the message would still require a separate OPC and DPC in the routing label for its own routing). However, the other switches in the network would not recognize the point code for switch 645 because they have not been reprogrammed. As such, they would not recognize the congested link, and might continue to inadvertently use it. STP 600 would convert the point codes in the management messages which define the congested link to point codes that would be recognized and properly acted upon by the signaling points receiving the management messages.

Each signaling point to receive a transfer restricted message could get a specific conversion. This is accomplished by using the DPC in the routing label of the management message to identify the receiving signaling points and obtain the specified conversion. For example, the point code defining the congested link might be of switch 655 for the message sent to switch 625, and it might be of switch 660 for the message sent to switch 630. In this case the DPCs in the routing labels would be used to access the specified conversions for the point code defining the congested link. In some cases conversion may be not be required for certain management message destinations. For example, a transfer restricted message regarding link 740 that is sent to switch 615. Message origination recognition could be used to discern whether conversion is required.

Figure 8:
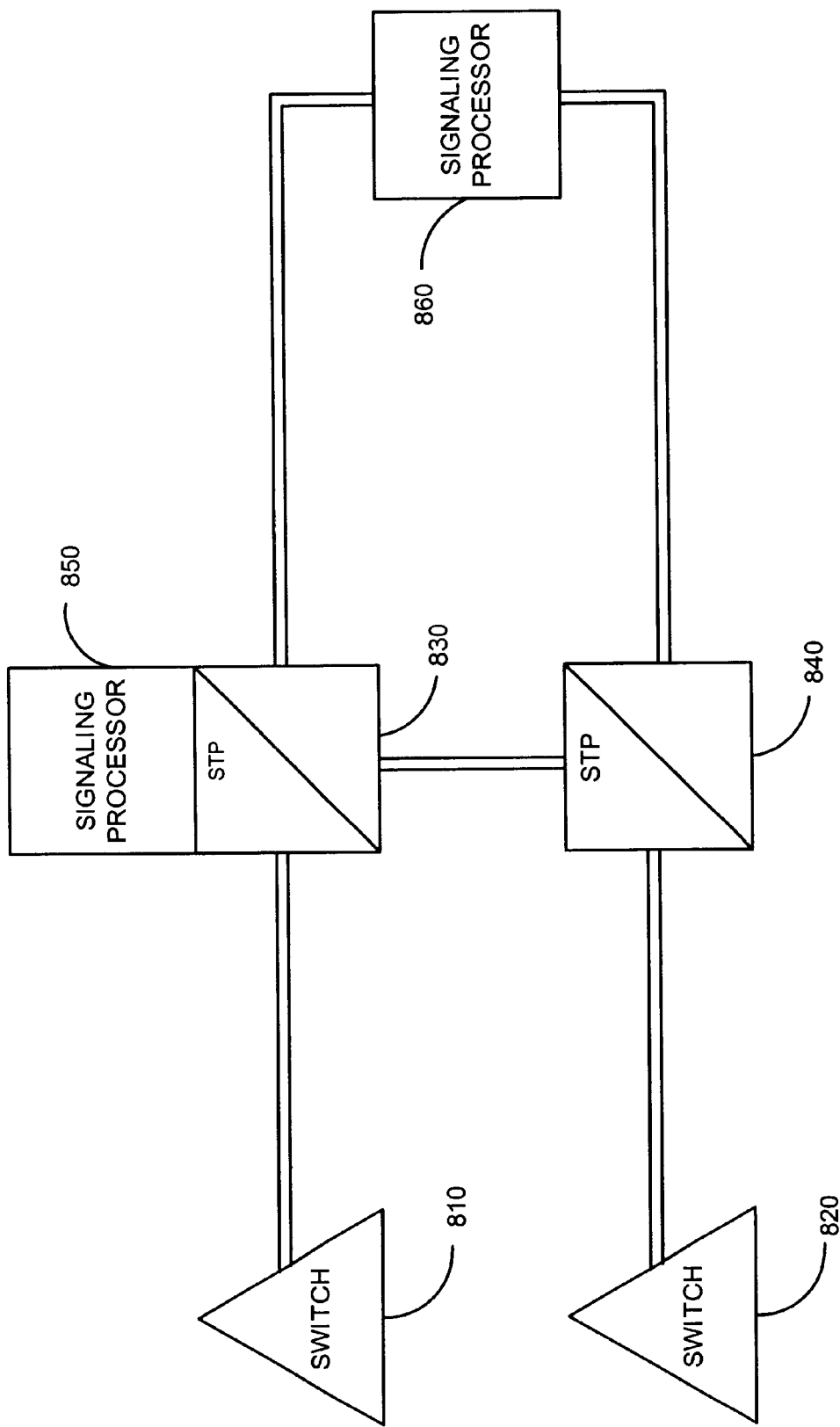
FIG. 8 is a block diagram of a version of the invention.

FIG. 8 depicts another embodiment of the invention. Switch 810 is shown linked to STP 830 and switch 820 is shown linked to STP 840. Signaling processor 850 is shown coupled to STP 830, and signaling processor 860 is shown linked to STP 830 and to STP 840. If switch 820 sends a message to switch 810 through STP 840, STP 840 could convert the DPC to represent the point code for signaling processor 860. As such, the message would be routed to signaling processor 860. A message from signaling processor 860 to switch 820 could have the OPC converted by STP 840 to represent the OPC of switch 810. In this way switch 820 does not need to be re-programmed, with the point code for signaling processor 860.

In addition, signaling processor 850 could function as a user part of STP 830. If switch 810 were to transmit a signal to switch 820, STP 830 could forward the signal to signaling processor 850 instead of switch 820. After processing the message, the signaling processor could transmit a message to switch 820 and STP 830 could convert the OPC to be that of switch 810. Messages from switch 820 to switch 810 could be treated in a similar fashion. In this way, signaling processor 850 can process the signaling between the switches in a way that was transparent to the switches.

There are many advantages gained from the present invention. When network architectures change, switches do not need to be re-programmed to signal each other in accord with the new architecture. This avoids a complex and time consuming task.

Because the present invention acts on signaling as enters MTP level 3 processing, multiple switches can be accommodated. Signaling directed to any switch in the network which passes through the STP can be converted. Prior systems only converted signaling after the route function of MTP level 3. The present invention allows one integrated and flexible system that acts on MTP level 3 input.

Because the present invention does not rely on individual trunk identification, it can efficiently address situations in which entire switch loads are moved between switches, or when multiple switch loads are consolidated on a single switch. In these cases, individual trunk recognition is unnecessary.

The present invention is capable of selecting destinations for signaling messages based on the origin of the messages. This allows conversions to be tailored for each source of signaling. Prior systems did not select signaling destinations which corresponded with the origin of the message, but based the selection on individual trunk identification or the destination point code.

The present invention can also accommodate the introduction of signaling processors into a network. Using the STP of the present invention, the signaling processors can avoid using point codes altogether or have a point code that is transparent to the rest of the network.

The present invention provides an efficient and operational STP which can convert signaling to accommodate architectural changes affecting several switches in a large network. The specification and figures provide embodiments of the present invention, but the present invention is not limited to these specific embodiments. Those skilled in the art can appreciate many applications of the present invention, which should be measured in accord with the following claims.

What is claimed is:

1. A method of operating a network routing system to handle a telecommunication signaling message, the method comprising:

receiving the telecommunication signaling message into the network routing system wherein the telecommunication signaling message includes information for setting-up telecommunications, wherein the telecommunication signaling message has a first origination code representing a first originating device that originated the telecommunication signaling message, and wherein the telecommunication signaling message has a first destination code representing a first destination device and that can be used to route the telecommunication signaling message to the first destination device;

using the first origination code in a software table to obtain a second destination code representing a second destination device and that can be used to route the telecommunication signaling message to the second destination device;

converting the first destination code in the telecommunication signaling message to the second destination code; and transferring the telecommunication signaling message having the second destination code from the network routing system wherein the second destination code is used by a network to route the telecommunication signaling message to the second destination device.

2. The method of claim 1 further comprising converting the first origination code in the telecommunication signaling message to a second origination code.

3. The method of claim 1 wherein the information for setting-up the telecommunications comprises a telephone number.

4. The method of claim 1 wherein the second destination device comprises a database that provides telecommunication routing information.

5. A method of operating a network routing system to handle a telecommunication signaling message, the method comprising:

receiving the telecommunication signaling message into the network routing system from one of a plurality of data links wherein the telecommunication signaling message includes information for setting-up telecommunications, wherein the telecommunication signaling message has a first origination code representing a first originating device, and wherein the telecommunication signaling message has a first destination code representing a first destination device and that can be used to route the telecommunication signaling message to the first destination device;

selecting a second destination code based on the one data link used to receive the telecommunication signaling message wherein the second destination code represents a second destination device and can be used to route the telecommunication signaling message to the second destination device;

converting the first destination code in the telecommunication signaling message to the second destination code; and transferring the telecommunication signaling message having the second destination code from the network routing system wherein the second destination code is used by a network to route the telecommunication signaling message to the second destination device.

6. The method of claim 5 further comprising converting the first origination code in the telecommunication signaling message to a second origination code.

7. The method of claim 5 wherein the information for setting-up the telecommunications comprises a telephone number.

8. The method of claim 5 wherein the second destination device comprises a database that provides telecommunication routing information.

9. A method of operating a network routing system to handle a telecommunication signaling message, the method comprising:

receiving the telecommunication signaling message into the network routing system wherein the telecommunication signaling message includes information for setting-up telecommunications, wherein the telecommunication signaling message has a first origination code representing a first originating device that originated the telecommunication signaling message, and wherein the telecommunication signaling message has a first destination code representing a first destination device and that can be used to route the telecommunication signaling message to the first destination device;

using the first origination code in a software table to obtain a second origination code representing a second origination device;

converting the first origination code in the telecommunication signaling message to the second origination code; and transferring the telecommunication signaling message having the second origination code from the network routing system.

10. The method of claim 9 further comprising converting the first destination code in the telecommunication signaling message to a second destination code representing a second destination device wherein the second destination code is used by a network to route the telecommunication signaling message to the second destination device.

11. The method of claim 10 wherein the second destination device comprises a database that provides telecommunication routing information.

12. The method of claim 9 wherein the information for setting-up the telecommunications comprises a telephone number.

13. A software product for use in a network routing system to handle a telecommunication signaling message received into the network routing system, wherein the telecommunication signaling message includes information for setting-up telecommunications, wherein the telecommunication signaling message has a first origination code representing a first originating device that originated the telecommunication signaling message, and wherein the telecommunication signaling message has a first destination code representing a first destination device and that can be used to route the telecommunication signaling message to the first destination device, the software product comprising:

software configured to direct the network routing system to use the first origination code in a software table to obtain a second destination code representing a second destination device and that can be used to route the telecommunication signaling message to the second destination device, and to convert the first destination code in the telecommunication signaling message to the second destination code, wherein the network routing system transfers the telecommunication signaling message having the second destination code; and a storage media that stores the software.

14. The software product of claim 13 wherein the software directs the network routing system to convert the first origination code in the telecommunication signaling message to a second origination code.

15. The software product of claim 13 wherein the information for setting-up the telecommunications comprises a telephone number.

16. The software product of claim 13 wherein the second destination device comprises a database that provides telecommunication routing information.

17. A software product for use in a network routing system to handle a telecommunication signaling message received into the network routing system from one of a plurality of data links wherein the telecommunication signaling message includes information for setting-up telecommunications, wherein the telecommunication signaling message has a first origination code representing a first originating device, and wherein the telecommunication signaling message has a first destination code representing a first destination device and that can be used to route the telecommunication signaling message to the first destination device, the software product comprising:

software configured to direct the network routing system to select a second destination code based on the one data link used to receive the telecommunication signaling message wherein the second destination code represents a second destination device and can be used to route the telecommunication signaling message to the second destination device, and to convert the first destination code in the telecommunication signaling message to the second destination code, wherein the network routing system transfers the telecommunication signaling message having the second destination code; and a storage media that stores the software.

18. The software product of claim 17 wherein the software directs the network routing system to convert the first origination code in the telecommunication signaling message to a second origination code.

19. The software product of claim 17 wherein the information for setting-up the telecommunications comprises a telephone number.

20. The software product of claim 17 wherein the second destination device comprises a database that provides telecommunication routing information.

21. A software product for use in a network routing system to handle a telecommunication signaling message received into the network routing system, wherein the telecommunication signaling message includes information for setting-up telecommunications, wherein the telecommunication signaling message has a first origination code representing a first originating device that originated the telecommunication signaling message, and wherein the telecommunication signaling message has a first destination code representing a first destination device and that can be used to route the telecommunication signaling message to the first destination device, the software product comprising:

software configured to direct the network routing system to use the first origination code in a software table to obtain a second origination code representing a second origination device, and to convert the first origination code in the telecommunication signaling message to the second origination code, wherein the network routing system transfers the telecommunication signaling message having the second origination code; and a storage media that stores the software.

22. The software product of claim 21 wherein the software directs the network routing system to convert the first destination code in the telecommunication signaling message to a second destination code representing a second destination device wherein the second destination code is used by a network to route the telecommunication signaling message to the second destination device.

23. The software product of claim 22 wherein the second destination device comprises a database that provides telecommunication routing information.

24. The software product of claim 21 wherein the information for setting-up the telecommunications comprises a telephone number.

\* \* \* \* \*